United States Patent

[11] 3,568,703

[72] Inventors Raymond W. Warren
Mc Lean, Va.;
Allen B. Holmes, Rockville, Md.
[21] Appl. No. 814,024
[22] Filed Apr. 7, 1969
[45] Patented Mar. 9, 1971
[73] Assignee The United States of America as represented by the Secretary of the Army

[54] SUPERSONIC JET ENGINE INLET FLUERIC BYPASS CONTROL
8 Claims, 2 Drawing Figs.

[52] U.S. Cl. ................................................. 137/81.5
[51] Int. Cl. ................................................. F15c 4/00, F15c 1/04
[50] Field of Search ........................................... 137/81.5; 239/265.19

[56] References Cited
UNITED STATES PATENTS
| | | | |
|---|---|---|---|
| 2,948,148 | 8/1960 | Anfreville et al. | 137/81.5UX |
| 3,068,880 | 12/1962 | Riordan | 137/81.5 |
| 3,111,931 | 11/1963 | Bodine | 137/81.5X |
| 3,204,652 | 9/1965 | Bauer | 137/81.5 |
| 3,212,515 | 10/1965 | Zisfein et al. | 137/81.5 |
| 3,348,766 | 10/1967 | Mugele | 137/81.5X |
| 3,452,707 | 7/1969 | Warren | 137/81.5X |
| 3,460,554 | 8/1969 | Johnson | 137/81.5X |
| 3,472,255 | 10/1969 | Fox et al. | 137/81.5 |

FOREIGN PATENTS
| | | | |
|---|---|---|---|
| 493,723 | 6/1953 | Canada | 239/265.19 |

*Primary Examiner*—Samuel Scott
*Attorneys*—Harry M. Saragovitz, Edward J. Kelly, Herbert Berl and J. D. Edgerton

ABSTRACT: A flueric system for controlling the position of the normal shock wave in a turbojet diffuser is disclosed. Control is accomplished without the use of mechanically moving parts by providing an exhaust tube for reducing the pressure downstream of the normal shock. A fluid feedback path which is responsive to a pressure differential on opposing sides of the shock wave produces a fluid control signal which is capable of deflecting fluid away from the exhaust tube and thereby effectively closing off the exhaust tube whenever the shock wave has relocated itself in a stable position.

PATENTED MAR 9 1971 3,568,703

INVENTORS,
RAYMOND W. WARREN
ALLEN B. HOLMES
BY Harry M. Saragovitz
Edward J. Kelly
Herbert Berl
J. D. Edgerton
ATTORNEYS

SUPERSONIC JET ENGINE INLET FLUERIC BYPASS CONTROL

BACKGROUND OF THE INVENTION

This invention relates to supersonic aircraft and in particular to a system for improving the operating efficiency of the turbojet diffuser employed in supersonic aircraft.

In the operation of supersonic aircraft, a function of the turbojet diffuser is to decelerate and compress air from its high, free stream velocity and low pressure at the intake to a low velocity, high pressure mass which is presented to the compresser intake of the turbojet propulsion system.

Theoretically, it is possible to compress the flow isentropically from supersonic speed to subsonic speed by duct contraction and then, by duct expansion, to decelerate the flow to the required terminal velocity. In the absence of viscous forces, the required compression would, theoretically, involve no losses. As a matter of practicality, this is difficult to achieve because losses, apart from those due to viscosity, are dependent upon the Mach number at which the shock occurs. These losses are equal to 0 where M equals 1 and increase with increasing Mach number. Since the point at which M equals 1 is generally at the throat, it is desirable to have the shock occur as close as possible to the throat region. The shock should not, however, be permitted to get too close to the throat because it can be shown experimentally that the normal shock is not stable when it occurs at the minimum throat. This instability might result in the shock being expelled through the intake, thereby producing a standing shock wave outside the intake. In order to prevent this situation it is necessary to maintain the shock wave at some point downstream of the throat. This of course implies that the shock will take place at M greater than 1 with some resulting losses in pressure due to this supersonic flow downstream of the throat. The ideal situation from the standpoint of stability and efficiency is, therefore, to maintain the shock slightly downstream of and as close as possible to the minimum throat.

It is therefore a primary object of this invention to provide a system for maintaining the shock wave as close as possible to and downstream of the minimum throat.

A further object of the invention is to maintain the shock wave in its desired position without the use of mechanically moving parts.

A still further object of the invention is to maintain the desired position of the shock wave wherein the only moving part is the fluid medium itself.

Still a further object of the invention is to provide a continuous and gradual control over the position of the shock wave within the diffuser.

SUMMARY OF THE INVENTION

Briefly, the invention accomplishes its purpose through the use of a flueric control element placed at the exterior of the turbojet diffuser so as to cause a reduction in pressure downstream of the throat. The flueric control element comprises an exhaust outlet to produce the desired reduction in pressure and a fluid feedback control nozzle to automatically open and close the exhaust outlet whenever flow conditions in the turbojet diffuser warrant control. Under normal operating conditions the exhaust outlet will remain closed due to the interaction of fluid from the control nozzle with fluid in the diffuser. If, however, the shock wave should move too close to the minimum throat where instability of operation might result, fluid in the control nozzle will cease to flow, thereby allowing some of the fluid in the diffuser to exhaust through the exhaust outlet and reduce the pressure in that region. This reduction in pressure downstream of the shock wave will cause the shock wave to be pushed downstream toward the region of reduced pressure and thereby stabilize the system.

BRIEF DESCRIPTION OF THE DRAWINGS

The specific nature of the invention as well as other objects, aspects, uses, and advantages thereof will clearly appear from the following description and from the accompanying drawings in which.

DESCRIPTION OF THE PREFERRED EMBODIMENT

Figure 1:
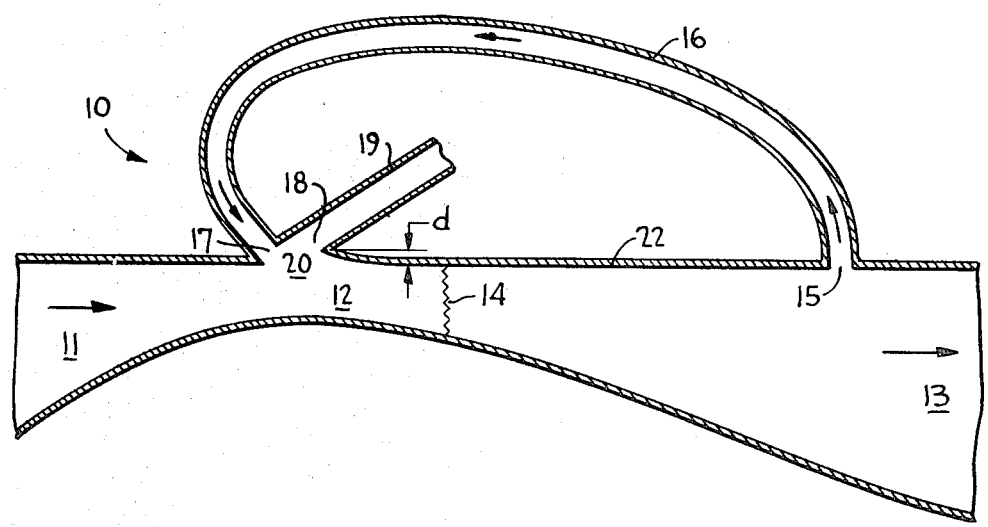
FIG. 1 shows an embodiment of the invention wherein the system is operating in its stable condition.

FIG. 1 shows the body 22 of a turbojet diffuser 10 generally used in supersonic aircraft. The function of the diffuser is to convert atmospheric air having a high velocity and low pressure at the intake 11 to a mass of air having low velocity and high pressure as is required to be presented to the turbojet propulsion system. Supersonic air at intake 11 is decelerated and compressed as it passes through the throat until a speed of $M=1$ is reached at the minimum throat 12. The air is then further compressed and decelerated as it continues to flow downstream in region 13. According to the law of conservation of momentum, the product of pressure and velocity remains constant throughout the length of the diffuser, but the mass of air in region 13 is at a considerably higher pressure and lower velocity than the air at intake 11. Exhaust tube 19 communicates with minimum throat 12 through inlet 18 to provide a means for reducing the pressure in minimum throat 12 under certain specified conditions discussed below. A small inlet 15 leads into feedback path 16 to provide a fluid flow path between downstream region 13 and minimum throat 12.

A stable operating condition is illustrated in FIG. 1 where shock wave 14 is located slightly downstream of minimum throat 12. Under this operating condition there will be a pressure differential between region 13 and region 12. This pressure differential will cause fluid to flow in feedback path 16, as shown by the arrows, and to enter minimum throat 12 through control nozzle 17. The interaction of fluid flowing from control nozzle 17 with fluid flowing in region 12 will deflect fluid away from inlet 18 of exhaust tube 19 and thereby prevent any of the fluid in region 12 from exhausting to the atmosphere. As long as the operating condition shown in FIG. 1 is maintained, the system will remain stable and efficient, and a high pressure, low velocity mass of air will be presented to the propulsion system. Exhaust tube 19 will remain effectively closed due to the interaction of fluid in control nozzle 17 with fluid in throat 12. An additional factor which tends to maintain exhaust 19 in a closed state is that the inlet 18 of exhaust 19 is slightly raised from exterior 30 by a small distance $d$ as shown in FIG. 1. Because the fluid flow in minimum area 12 is at a very high velocity, Mach 1 or higher, the fluid simply cannot make the turn fast enough to enter inlet 18. In fact, the flow in area 12 is so fast that the reverse effect may take place in exhaust tube 19, that is, some atmospheric air may be drawn into area 12 due to the reduction in pressure in exhaust 19. This reverse effect is not desirable and can be controlled so that there is no flow at all in exhaust tube 19 under ideal operating conditions.

Figure 2:
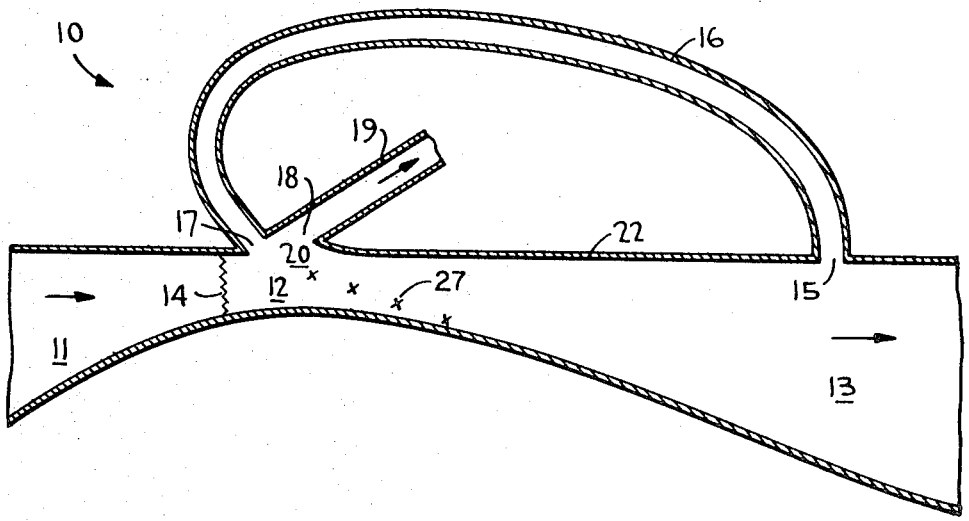
FIG. 2 shows the embodiment of the invention operating in an unstable condition.

FIG. 2 shows the system in an unstable operating condition. Shock wave 14 is now located in the throat 12 and slightly upstream of control nozzle 17. This operating condition may have been caused by an increase in fluid pressure at the compressor area which caused increased fluid pressure in region 13, thereby forcing the shock wave upstream into the throat. As previously indicated, this operating condition is unstable and may result in the shock wave being expelled from the diffuser. In order to prevent this and to restore stable operating conditions the automatic fluid control system will now take over. Because shock wave 14 is situated upstream of interaction region 20 of throat 12, the pressure differential between region 20 and inlet 15 of region 13 is now significantly reduced. This is because both region 12 and region 13 are now located on the same side of shock wave 14 and therefore the fluid flow in both these regions is subsonic and of reduced pressure. As a result of this reduced pressure differential the fluid flow in feedback path 16 will be greatly reduced and there will no longer be a control signal at nozzle 17 sufficient to deflect fluid in region 12 away from inlet 18 of exhaust tube 19. Additionally, the fluid velocity in region 12 being downstream of the shock wave, will be reduced and will more easily be able to negotiate the turn into inlet 18. Consequently, fluid will flow into inlet 18, attach itself to the walls 19, and flow out through the exhaust. This fluid flow will reduce the pressure downstream of shock wave 14 and, as a result of this reduced pressure, the shock wave will be caused to move downstream, thereby stabilizing the system. Once the shock wave has relocated itself downstream of interaction region 20, the pressure differential between region 13 and region 20 will increase, more control fluid will now flow in feedback path 16 and out from control nozzle 17, exhaust 19 will again be effectively closed off and the stable operating conditions shown in FIG. 1 will have been reestablished.

In order to provide a uniform and continuous controlling function, the invention contemplates the use of a plurality of flueric control systems such as the one described above, and placed throughout the throat region. The interaction regions 20 should be located substantially as indicated by the X's 27 in FIG. 2 so that a gradual and continuous control can be maintained on the shock wave as it tends to move closer to the minimum throat.

The distance between exit tube 15 and control tube 17 is made sufficiently large so as to include the normal operating range of shock wave 14. In the event that shock wave 14 travels downstream beyond inlet 15, the fluid feedback control means would loose its operability and its controlling function. However, when the shock wave 14 is brought back within the operating of the control mechanism as by some other means such as increased pressure at the compressor, the control mechanism would again take over and function as previously described. The system as described would normally maintain stable operating conditions and therefore prevent shock wave 14 from ever being expelled. However, in the event that shock wave 14 is expelled, it would have to be brought back by conventional means such as by diving the aircraft. Again, once shock wave 14 is brought back within the operating range it would again resume its controlling function as previously described.

The various dimensions of the control system will depend upon such factors as the physical size of the turbojet diffuser, the desired operating speed of the aircraft and the number of individual control nozzles which can be conveniently placed around the exterior of the diffuser body. As a typical example, exhaust 19 and control nozzle 17 may be of the order of one inch square or round, and feedback tube 16 may be of the order of three-eights of an inch. Distance $d$ is typically about one-half inch.

It should be understood that the invention is not to be limited to the exact details of construction shown and described, for obvious modifications will occur to a person skilled in the art.

We claim:

1. A control system for improving the operating efficiency of a turbojet diffuser having an intake means and a minimum throat region, comprising:
   a. a pressure reducing means for reducing the pressure in said throat region; and
   b. a flueric control means for controlling the operation of said pressure reducing means.

2. The system of claim 1 wherein the pressure reducing means comprises an exhaust tube in fluid communication with said throat region and said control means comprises a control nozzle for directing control fluid into said throat region and blocking the flow of fluid into said exhaust tube.

3. The system of claim 2 further comprising a fluid feedback path connected between said fluid control nozzle and a point downstream of said throat region for supplying control fluid to said control nozzle.

4. The system of claim 3 wherein the junction of said exhaust tube and said control nozzle defines an interaction region, said interaction region being in fluid communication with said throat region, said control nozzle and said exhaust tube.

5. The combination defined in claim 4 further comprising a plurality of individual control systems spaced along the length of said turbojet diffuser.

6. The combination of claim 5 wherein the interaction regions of said control systems lie in a plane which is at an oblique angle with respect to the direction of fluid flow in said turbojet diffuser.

7. In the operation of a turbojet diffuser having an intake means and a throat region, the method of controlling the position of the normal shock wave comprising the steps of:
   a. exhausting a portion of the fluid through an exhaust tube located downstream of said normal shock wave to reduce the fluid pressure in the downstream region;
   b. sensing a fluid pressure differential between an upstream region and a downstream region of said shock wave;
   c. deriving a fluid control signal in response to said fluid pressure differential; and
   d. deflecting fluid away from said exhaust tube whenever said fluid control signal exceeds a minimum value, whereby said exhaust tube is effectively closed in response to said fluid control signal.

8. The method of claim 7 wherein the step of deriving a fluid control signal comprises the steps of:
   a. diverting a small portion of fluid from a region downstream of said shock wave, and
   b. feeding back said diverted fluid to a region upstream of said shock wave.